US012011916B2

(12) United States Patent
Ashdown et al.

(10) Patent No.: US 12,011,916 B2
(45) **Date of Patent: *Jun. 18, 2024**

(54) WASH-UP BLADE

(71) Applicant: Explorer Pressroom Solutions, Santa Fe Springs, CA (US)

(72) Inventors: Gilbert M. Ashdown, Corona, CA (US); Raymond Dabela, Chino Hills, CA (US)

(73) Assignee: Explorer Pressroom Solutions, Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,098

(22) Filed: Apr. 11, 2022

(65) Prior Publication Data

US 2022/0242107 A1 Aug. 4, 2022

Related U.S. Application Data

(63) Continuation-in-part of application No. 17/237,088, filed on Apr. 22, 2021, now Pat. No. 11,298,935.

(60) Provisional application No. 63/015,874, filed on Apr. 27, 2020.

(51) Int. Cl.
*B41F 35/00* (2006.01)

(52) U.S. Cl.
CPC .................................. *B41F 35/001* (2013.01)

(58) Field of Classification Search
CPC ..... B41F 35/00; B41F 35/001; B41P 2235/21
See application file for complete search history.

(56) References Cited

U.S. PATENT DOCUMENTS 2,445,140 A * 7/1948 Hanington .............. B41F 15/44
37/232

FOREIGN PATENT DOCUMENTS

EP 1106354 * 6/2001 .............. B41F 35/00

* cited by examiner

*Primary Examiner* — Christopher E Mahoney
*Assistant Examiner* — Marissa Ferguson-Samreth
(74) *Attorney, Agent, or Firm* — Elie Gendloff; Gendloff IP

(57) ABSTRACT

Provided is an apparatus suitable for use as a printer wash-up blade. Also provided is a method of cleaning a roller on a rotary printing press using the above apparatus.

15 Claims, 2 Drawing Sheets

WASH-UP BLADE

CROSS-REFERENCE TO RELATED APPLICATIONS

This application is a continuation-in-part of U.S. patent application Ser. No. 17/237,088, filed Apr. 23, 2021 and to be issued as U.S. Pat. No. 11,298,935 on Apr. 12, 2022, which claims the benefit of U.S. Provisional Application No. 63/015,874, filed Apr. 27, 2020, and incorporated by reference herein in its entirety.

BACKGROUND OF THE INVENTION

(1) Field of the Invention

The present application generally relates to printing press roller washing apparatuses. More specifically, an improved wash-up blade is provided.

(2) Description of the Related Art

Printers such as offset printers, flexographic printers, and gravure printers, operate by transferring an image to be printed from a printing plate to a blanket onto printing media, i.e., paper, plastic, metal, wood or cardboard. At the end of a run, the ink must be removed from the ink roller(s) that transfers the ink to the printing plate. For that purpose, the wash-up blade provides an angled edge that is placed adjacent to the roller, and the roller is rotated such that the ink on the roller is scraped off of the roller by the angled edge.

Wash-up blades must be replaced when they wear out, usually after 3-8 months of use, and can be ineffective in scrapping sufficient ink off of the roller. Thus, there is a need for an improved wash-up blade that lasts longer and is more effective. The present invention satisfies that need.

BRIEF SUMMARY OF THE INVENTION

The present invention is directed to an improved printer wash-up blade having an edge with an angle less than 30 degrees.

Thus, provided is a substantially rectangular apparatus suitable for use as a printer wash-up blade. The apparatus has a top, a bottom, a first long side and a second long side that are substantially parallel, two short sides that are substantially parallel, and a width. In these embodiments, the short sides are both between 0.75 inches and 3 inches in length; and the long sides are both between 10 inches and 90 inches in length. Additionally, the width along the first long side is between 0.07 inches and 0.15 inches, and the width along the second long side is between 0.015 inches and 0.075 inches. In this apparatus, the width along the first long side is between 0.07 inches and 0.15 inches, and the width along the second long side is between 0.015 inches and 0.075 inches; the width narrows between the first long side and the second long side such that the angle between the second long side and the bottom is less than 30 degrees; and the apparatus further comprises a bend between the first long side and the second long side across the entire apparatus.

Also provided is a method of cleaning a roller on a rotary printing press. The method comprises rotating the roller adjacent to the above-described apparatus.

DETAILED DESCRIPTION OF THE INVENTION

The present invention is directed to an improved printer wash-up blade having an edge that is placed against a printer's roller during a wash-up process with an angle less than 30 degrees.

Thus, provided is substantially rectangular apparatus suitable for use as a printer wash-up blade. The apparatus has a top, a bottom, a first long side and a second long side that are substantially parallel, two short sides that are substantially parallel, and a width. In these embodiments, the short sides are both between 0.75 inches and 3 inches in length; and the long sides are both between 10 inches and 90 inches in length. Additionally, the width along the first long side is between 0.07 inches and 0.15 inches, and the width along the second long side is between 0.015 inches and 0.055 inches. In this apparatus, the width narrows between the first long side and the second long side such that the angle between the second long side and the bottom is less than 30 degrees.

Figure 1:
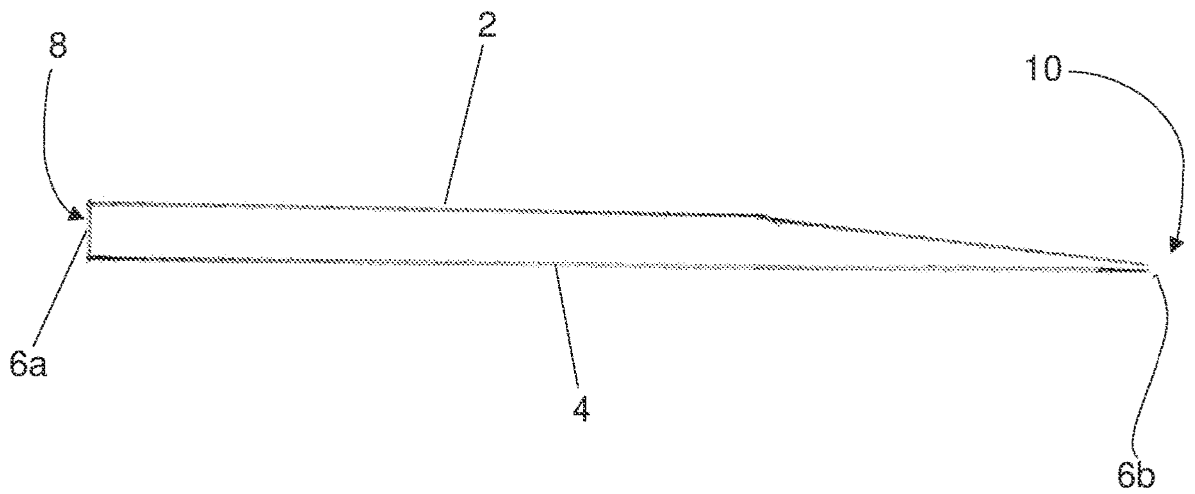
FIG. 1 is a cross-section of a wash-up blade in accordance with some embodiments of the present invention.

One embodiment of the apparatus is illustrated in cross-section between the first long side and the second long side in FIG. 1. The top 2, the bottom 4, the first long side 6*a* and the second long side 6*b* are shown. At the first long side 6*a*, the apparatus has width 8, between 0.07 inches and 0.15 inches. Between the first long side 6*a* and the second long side 6*b*, the width decreases such that, at the second long side 6*b*, the width is greatly decreased, between 0.015 inches and 0.055 inches. The angle 10 between the second long side 6*b* and the bottom 4 is less than 30 degrees. This is contrasted with wash-up blades currently in use, which all have an angle of 30-45 degrees. This more acute angle in the wash-up blades of the present invention provides for less wear and tear at the second long side and for better flow of fluid away from the roller when compared to wash-up blades having an angle of 30-45 degrees.

In various embodiments, the apparatus further comprises a bend between the first long side and the second long side across the entire apparatus. It has been discovered that the bend can provide for better contact between the blade and a printer roller when attached to a printer.

Figure 2:
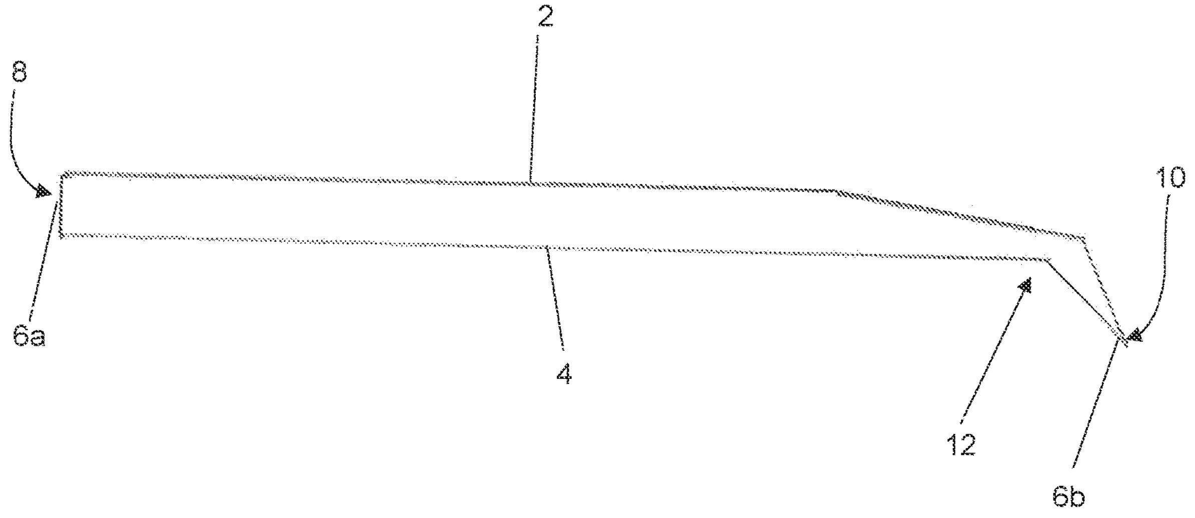
FIG. 2 is a cross-section of a wash-up blade in accordance with additional embodiments of the present invention.

FIG. 2 illustrates one non-limiting example of a wash-up blade having a bend. The bend 12 can be anywhere along the two short sides. In some embodiments, the bend is positioned 0.5-1.5 inches from the second long side toward the first long side. Additionally, the bend can have any angle, from less than 1 degree to 90 degrees. In some of those embodiments, the bend is at an angle of 5-80 degrees.

In some embodiments, the bend directs the second long side upward, past the top of the apparatus. In other embodiments, the bend directs the second long side downward, past the bottom of the apparatus.

In some embodiments, the apparatus further comprises a plurality of holes through the top and bottom suitable for attaching the apparatus to a printer. These holes can be positioned along the top to allow attachment to any printer now known or later developed.

In various embodiments, the short sides are both between 1 inch and 2.5 inches inclusive. In additional embodiments, the long sides are both between 12 inches and 80 inches inclusive. In further embodiments, the width along the first long side is between 0.078 inches and 0.125 inches inclusive. In other embodiments, the width along the second long side is between 0.02 inches and 0.05 inches inclusive.

In some embodiments, the angle between the second long side and the bottom is between 20 degrees and 2 degrees inclusive. In other embodiments, the angle between the second long side and the bottom is between 10 degrees and 3 degrees inclusive. In further embodiments, the angle between the second long side and the bottom is between 7 degrees and 4 degrees inclusive. In specific embodiments, the angle between the second long side and the bottom is about 5 degrees.

The apparatus of the present invention can be made of any suitable material or combinations of material. Nonlimiting examples of suitable materials from which the apparatus can be made are plastic, metal or rubber.

In some embodiments, the entire apparatus comprises one material. In specific embodiments, the material comprises a plastic. Useful plastics for these embodiments include HDPE, polypropylene and polyolefin.

In other embodiments, the second long side is a different material than other parts of the apparatus. In some of these embodiments, the second long side comprises a resilient material, e.g., rubber.

In some embodiments, the apparatus is attached to a printer. In these embodiments, the printer can be any printer, now known or later developed, that utilizes a wash-up blade, e.g., any printer that uses a rotary printing press. Nonlimiting examples include offset printers, flexographic printers and gravure printers.

Also provided is a method of cleaning a roller on a rotary printing press. The method comprises rotating the roller adjacent to the above-described apparatus.

In view of the above, it will be seen that several objectives of the invention are achieved and other advantages attained.

As various changes could be made in the above methods and compositions without departing from the scope of the invention, it is intended that all matter contained in the above description and shown in the accompanying drawings shall be interpreted as illustrative and not in a limiting sense.

All references cited in this specification, including but not limited to patent publications and non-patent literature, are hereby incorporated by reference. The discussion of the references herein is intended merely to summarize the assertions made by the authors and no admission is made that any reference constitutes prior art. Applicants reserve the right to challenge the accuracy and pertinence of the cited references.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A substantially rectangular apparatus suitable for use as a printer wash-up blade, the apparatus having a top, a bottom, a first long side and a second long side that are substantially parallel, two short sides that are substantially parallel, and a width, wherein the short sides are both between 0.75 inches and 3 inches in length; and the long sides are both between 10 inches and 90 inches in length, wherein the width along the first long side is between 0.07 inches and 0.15 inches, and the width along the second long side is between 0.015 inches and 0.075 inches;

the width narrows between the first long side and the second long side such that the angle between the second long side and the bottom is less than 30 degrees; and the apparatus further comprises a bend between the first long side and the second long side across the entire apparatus.

2. The apparatus of claim 1, wherein the bend is at an angle of 5-80 degrees.

3. The apparatus of claim 1, wherein the bend is positioned 0.5-1.5 inches from the second long side toward the first long side.

4. The apparatus of claim 1, wherein the bend directs the second long side downward, past the bottom of the apparatus.

5. The apparatus of claim 1, wherein the short sides are both between 1 inch and 2.5 inches inclusive.

6. The apparatus of claim 1, wherein the long sides are both between 12 inches and 80 inches inclusive.

7. The apparatus of claim 1, wherein the width along the first long side is between 0.078 inches and 0.125 inches inclusive.

8. The apparatus of claim 1, wherein the width along the second long side is between 0.02 inches and 0.05 inches inclusive.

9. The apparatus of claim 1, wherein the angle between the second long side and the bottom is between 10 degrees and 3 degrees inclusive.

10. The apparatus of claim 9, made of a plastic.

11. The apparatus of claim 10, wherein the plastic comprises HDPE, polypropylene or polyolefin.

12. The apparatus of claim 1, wherein the angle between the second long side and the bottom is between 7 degrees and 4 degrees inclusive.

13. The apparatus of claim 1, wherein the angle between the second long side and the bottom is about 5 degrees.

14. The apparatus of claim 1, wherein the second long side is a different material than other parts of the apparatus.

15. The apparatus of claim 14, wherein the second long side comprises rubber.

* * * * *